(12) United States Patent
Frank

(10) Patent No.: US 7,383,744 B2
(45) Date of Patent: Jun. 10, 2008

(54) SEAT BELT TENSION SENSOR

(75) Inventor: Ronald I. Frank, Sharon, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 11/357,355

(22) Filed: Feb. 17, 2006

(65) Prior Publication Data
US 2006/0197520 A1 Sep. 7, 2006

Related U.S. Application Data

(60) Provisional application No. 60/654,751, filed on Feb. 18, 2005.

(51) Int. Cl.
*G01L 1/26* (2006.01)
*G01L 5/04* (2006.01)

(52) U.S. Cl. .................................. 73/862.391
(58) Field of Classification Search ............ 73/862.391
See application file for complete search history.

(56) References Cited

U.S. PATENT DOCUMENTS 3,482,872 A * 12/1969 Chamberlain ............... 297/472
3,784,972 A    1/1974 Hults
4,065,198 A    12/1977 Jordan (Continued)

FOREIGN PATENT DOCUMENTS

| | | |
|---|---|---|
| DE | 3233153 | 3/1984 |
| EP | 1462318 | 9/2004 |
| WO | 9318380 | 9/1993 |
| WO | 0179039 | 10/2001 |
| WO | 0240317 | 5/2002 |
| WO | 0244679 | 6/2002 |

OTHER PUBLICATIONS

Heremans, "Magnetic Field Sensors for Magnetic Position Sensing in Automotive Applications", General Motors Corporation Research and Development Center, Apr. 1, 1997 (16 pages).

*Primary Examiner*—Michael Cygan
*Assistant Examiner*—Octavia Davis
(74) *Attorney, Agent, or Firm*—Grossman, Tucker, Perreault & Pfleger, PLLC

(57) ABSTRACT

A seat belt tension sensor assembly including magnets oriented to reduce assembly size comprises a pull plate having portions defining a belt loop opening for receiving seat belt webbing and a sensor opening. First and second magnets are coupled to the pull plate on opposite sides of the sensor opening and are oriented with a first pole adjacent the sensor opening and second pole positioned away from the opening toward a side of the sensor assembly. A sensor disposed in the sensor opening is configured to provide an output in response to flux imparted thereto by the magnets. At least one projection extends from the sensor opening of the pull plate generally towards the sensor and is configured to direct magnetic flux from the magnets in a closed-loop path through the sensor. Upon application of tension to the seat belt webbing, the pull plate is configured to move along a first axis of the seat belt tension sensor assembly relative to the sensor. The output of the sensor is indicative of a level of the tension.

12 Claims, 5 Drawing Sheets

U.S. PATENT DOCUMENTS

| | | | |
|---|---|---|---|
| 4,457,570 A | 7/1984 | Bogese, II | |
| 4,553,625 A * | 11/1985 | Tsuge et al. | 180/268 |
| 4,618,917 A | 10/1986 | Lee et al. | |
| 5,060,977 A | 10/1991 | Saito | |
| 5,636,864 A | 6/1997 | Hori | |
| 5,996,421 A | 12/1999 | Husby | |
| 6,081,759 A | 6/2000 | Husby et al. | |
| 6,205,868 B1 | 3/2001 | Miller | |
| 6,230,088 B1 | 5/2001 | Husby | |
| 6,336,371 B1 | 1/2002 | O'Boyle | |
| 6,400,145 B1 | 6/2002 | Chamings et al. | |
| 6,477,753 B1 * | 11/2002 | Burke | 24/637 |
| 6,502,860 B1 | 1/2003 | Siegfried et al. | |
| 6,508,114 B2 | 1/2003 | Lawson | |
| 6,520,540 B1 | 2/2003 | Siegfried et al. | |
| 6,554,318 B2 | 4/2003 | Kohut et al. | |
| 6,729,194 B2 | 5/2004 | Kaijala et al. | |
| 6,732,592 B1 | 5/2004 | Blackburn et al. | |
| 6,746,048 B2 * | 6/2004 | Tajima et al. | 280/801.1 |
| 6,749,038 B2 | 6/2004 | Sullivan et al. | |
| 6,776,056 B2 | 8/2004 | Garver et al. | |
| 6,857,326 B2 | 2/2005 | Specht et al. | |
| 7,100,944 B2 * | 9/2006 | Stanley | 280/801.1 |
| 2003/0150283 A1 | 8/2003 | Stanley, et al. | |
| 2003/0155166 A1 | 8/2003 | Sullivan, et al. | |
| 2004/0016304 A1 | 1/2004 | Kaijala, et al. | |
| 2006/0254033 A1 * | 11/2006 | Smith | 24/633 |

\* cited by examiner

SEAT BELT TENSION SENSOR

CROSS-REFERENCE TO RELATED APPLICATIONS

This application claims the benefit of the filing date of U.S. Provisional Application Ser. No. 60/654,751, filed Feb. 18, 2005, the teachings of which are hereby incorporated herein by reference.

FIELD

The present invention relates in general to tension sensors, and, more particularly, to a seat belt tension sensor for sensing the level of tension on a seat belt in a vehicle.

BACKGROUND

Seat belt tension sensors may be used in vehicle systems for setting an air bag system at a proper deployment force associated with a particular seat occupant. Seat belt tension sensors generally provide an output representative of the tension imparted to a seat belt disposed around the occupant. This output may be provided to a processor along with outputs from other sensors, e.g. a weight sensor and/or seat position sensor. The processor may be configured for setting an air bag system to an appropriate deployment force in response to the outputs. For example, if the seat occupant is a child, the sensor outputs may cause the processor to set the deployment force at a level appropriate for avoiding injury to the child, or even disable the system. On the other hand, if the occupant is an adult, the processor may set the system for deployment at a force sufficient to protect the occupant in the event of an accident.

Of course seat belt tension sensors must provide an output that reliably and accurately indicates the tension imparted to the seat belt. In automotive applications size, ease of installation and cost are also considerations. There is a need for a seat belt tension sensor that is small in size, and provides accurate and reliable tension sensing while allowing cost-effective manufacture and installation. Some seat belt tension sensors may be too long for an efficient seat mount application.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION

For ease of explanation, sensor systems consistent with the invention will be described herein in connection with automobile seat belt systems. It will be recognized, however, a seat belt tension sensor consistent with the invention will be useful in connection with a wide variety of vehicle types. In addition, exemplary embodiments described herein include use of Hall Effect sensors and a magnet. Those skilled in the art will recognize, however, that a variety of sensing means may be used. For example, optical, magneto-resistive, fluxgate sensors, etc. may be useful in connection with a sensor system consistent with the invention. In alternative embodiments, sensor control elements other than magnets or shunts, e.g. an optical source, may be used. It is to be understood, therefore, that illustrated exemplary embodiments described herein are provided only by way of illustration, and are not intended to be limiting.

Figure 1:
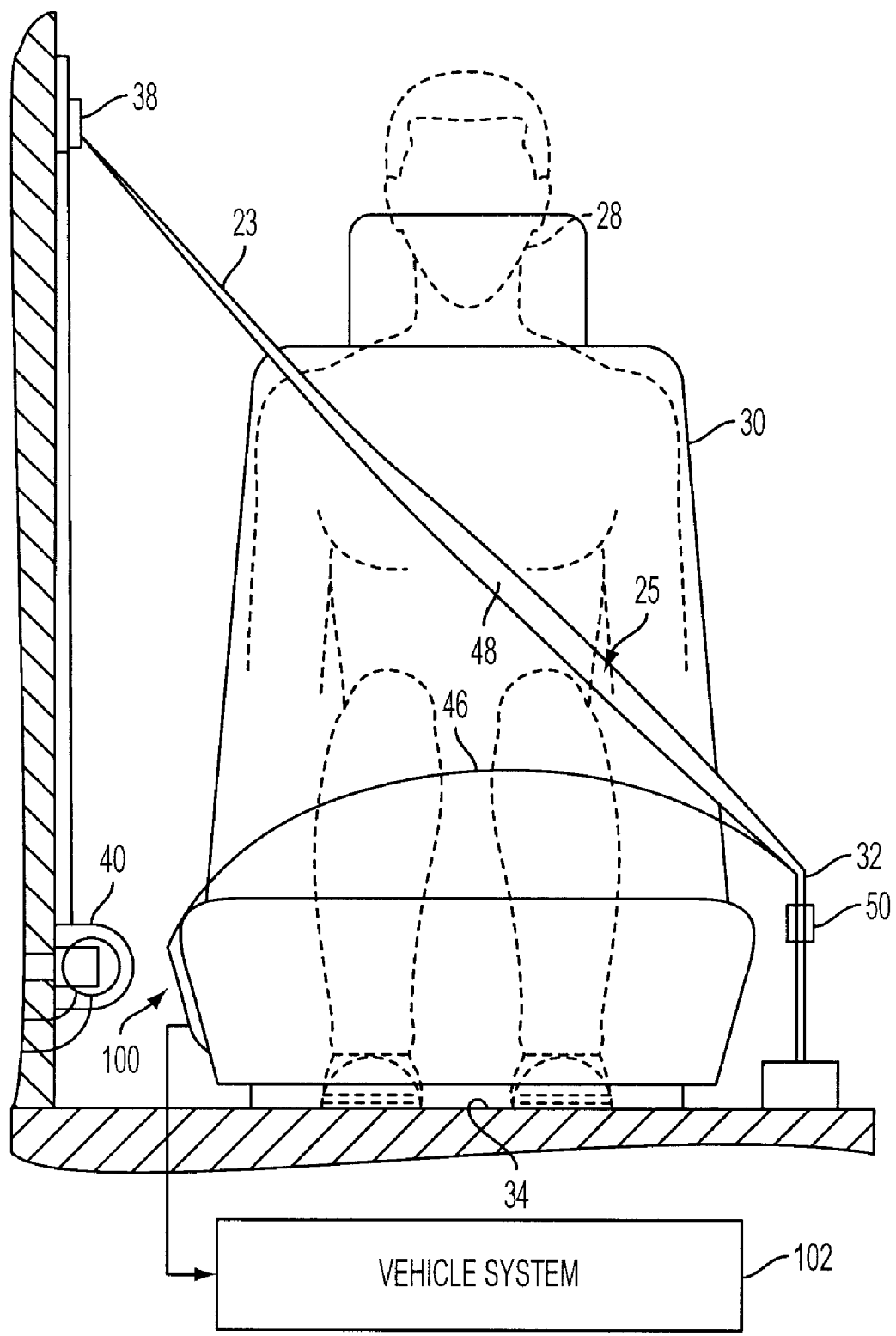
FIG. 1: illustrates an exemplary seat belt tension system consistent with an embodiment with the seat belt in a buckled condition.

Turning to FIG. 1, there is illustrated one exemplary vehicle seat belt assembly including a seat belt tension sensor 100 consistent with an embodiment. In the illustrated system, the seat belt assembly 23 includes a length of seat belt webbing 25 that is extensible, in a traditional manner, about a vehicle occupant 28 of a vehicle seat 30. A buckle tongue 32 is slidably attached to the webbing. The seat belt webbing may be anchored to a lower portion of one side of the seat 30 through a seat belt tension sensor 100 consistent with an embodiment. The webbing 25 may extend upwardly from the sensor 100 and pass through a D-ring or turning loop 38.

The webbing 25 may be attached to a seat belt retractor assembly 40. The seat belt retractor assembly 40 may include a spool, which is rotatable to wind a portion of the webbing 25 around the spool within the retractor assembly. The spool may be biased, such as by a spring mounted within the assembly 40, to wind a portion of the seat belt webbing around the spool. In addition, the retractor assembly 40 may include a ratchet wheel and a pawl by which the rotation of the retractor spool may be locked under certain circumstances.

The seat belt assembly is illustrated in FIG. 1 in a belted condition. The buckle tongue 32 is adjustable along the length of the webbing to divide the webbing 25 into respective lap and torso portions 46 and 48 when the webbing is belted around the vehicle occupant. A seat belt buckle 50 is located adjacent the side of the seat 30 opposite the retractor assembly 40. The buckle 50 releasably receives the buckle tongue 32, and is anchored to the vehicle.

Advantageously, the sensor 100 provides an output to a vehicle system 102, such as an airbag deployment control system, indicating the level of tension on the seat belt. The level of tension may be evaluated in the system to assist in determining the nature of the occupant 28 disposed within the seat 30. For example, the tension sensed by the sensor 100 may be provided to the system 102, e.g. along with other sensor outputs (e.g. weight sensors, seat position sensors, etc.) to set an air bag for deployment at a particular deployment force deemed safe for the occupant.

Figure 2:
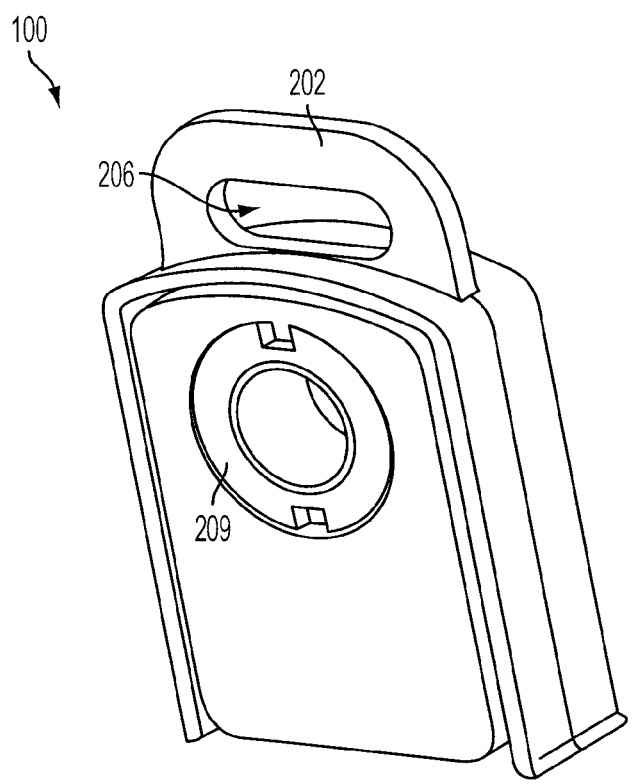
FIG. 2: is a rear view of one exemplary seat belt tension sensor consistent with an embodiment that may be used in the system of FIG. 1.

One embodiment of a seat belt tension sensor 100 consistent with an embodiment is illustrated in FIGS. 2-7. FIG. 2 is a rear view of the seat belt tension sensor. The pull plate 202 may have a portion extending beyond the housing of the sensor 100. The pull plate may be comprised of metal. The pull plate 202 may also have portions defining a belt loop opening 206. The webbing 25 of the seat belt may pass through the opening 206. The seat belt may provide a tension force to pull the pull plate 202 varying distances depending on the level of seat belt tension. A bolt bushing nut 209 may be riveted over for securing the assembly components such that no nut is needed.

Figure 3:
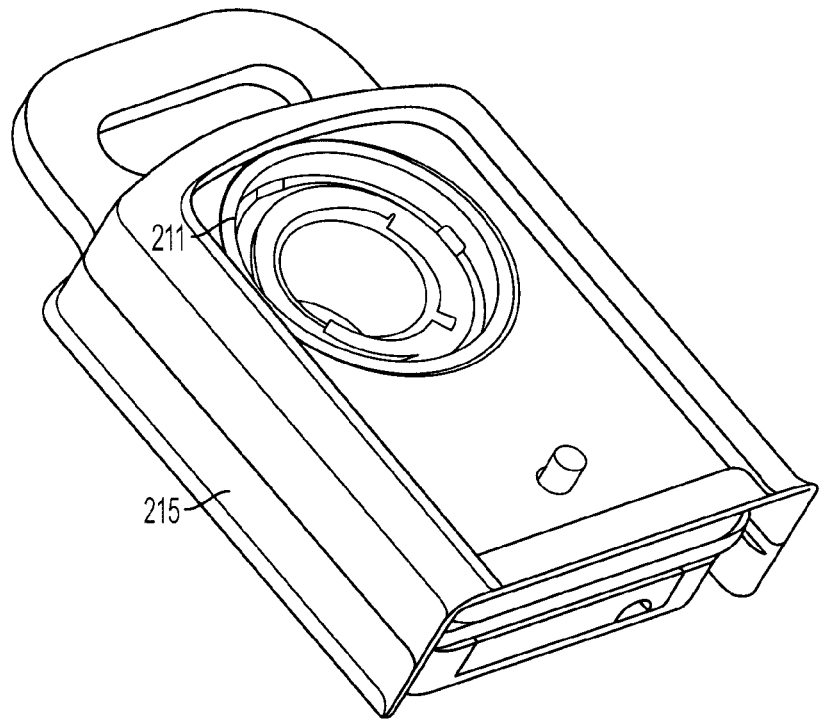
FIG. 3: is a top view of the sensor of FIG. 2.

FIG. 3 illustrates a top view of the seat belt tension sensor 100. A center metal bushing 211 may protect the sensor from overloads, e.g., that may occur during vehicle crash conditions and it may also serve as a rivet to hold the sensor parts together. A protective hood 215 may be attached to the movable pull plate 202. Fluids and other contaminants may therefore be directed away from the sensor by the hood 215.

Figure 4:
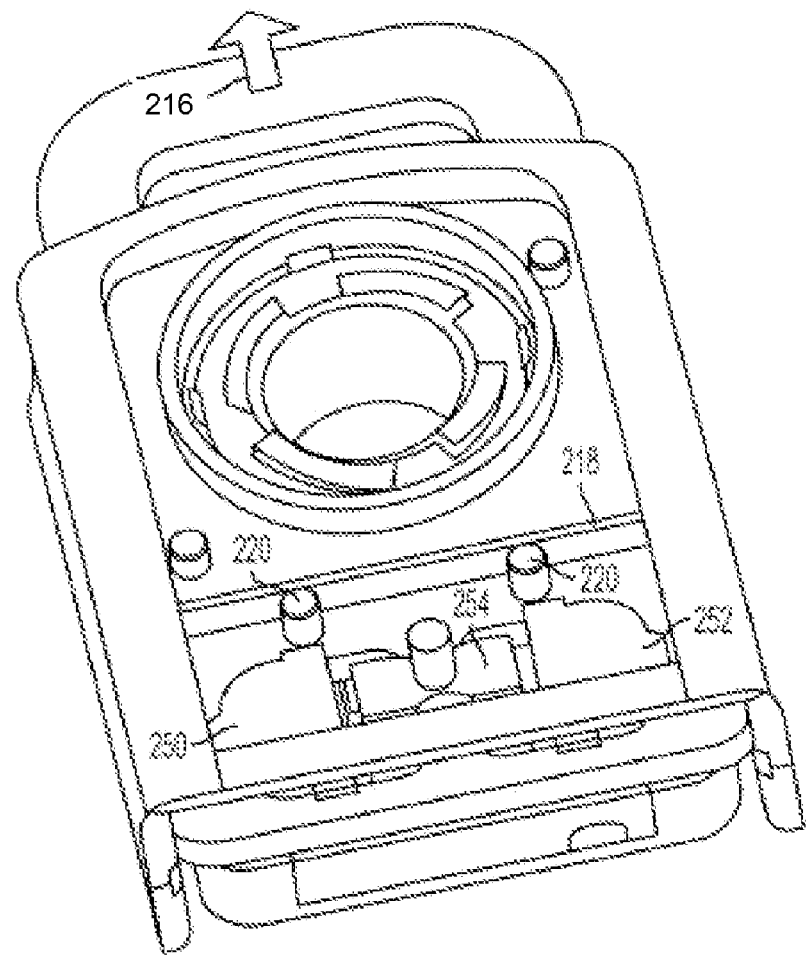
FIG. 4: is top view of the sensor of FIG. 2 with the top cover removed.

FIG. 4 illustrates the sensor 100 with the top cover removed. As tension is applied from the seat belt to the pull plate 202 the pull plate may move in the direction of the arrow 216. Magnets may be in magnet holders 250 and 252 and the magnet holders may be coupled to the pull plate such that the magnets move with the pull plate 202. A Hall sensor may be in a holder 254 disposed in a sensor opening in the pull plate. The Hall sensor 254 may provide an output signal in response to magnetic flux imparted thereto and which changes as the magnets move relative to the Hall sensor. A leaf spring 218 may be utilized in conjunction with pins 220 to provide a force versus motion linear correlation.

Figure 5:
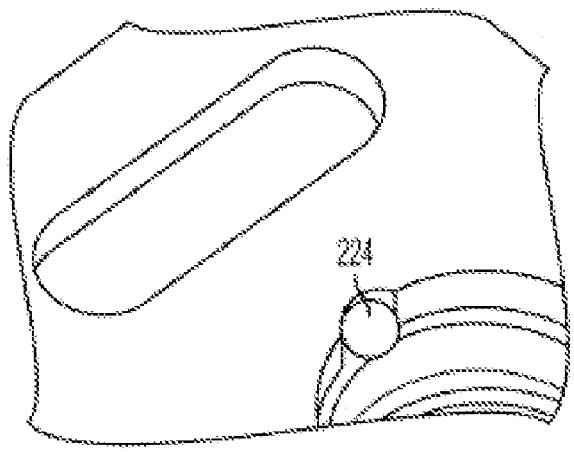
FIG. 5: is a view of the pull plate and spring element.
Figure 6:
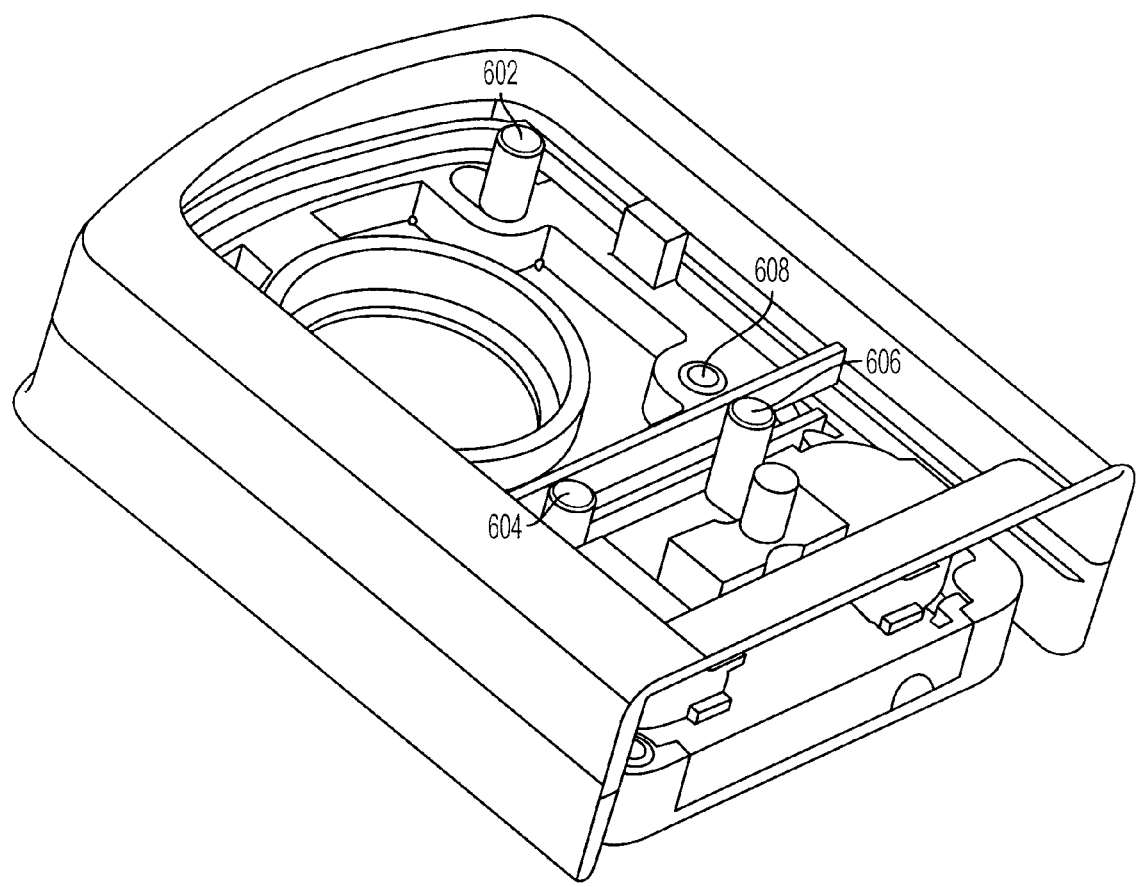
FIG. 6: is an exposed top view of the sensor of FIG. 2 with the top cover, pull plate and mount bushings removed.

FIG. 5 illustrates a spring element, e.g., a flexible ball 224 to pre-bias the sensor to leaf springs to zero force/movement position and prohibit undesirable sounds such as buzz, squeak, and rattle sounds. FIG. 6 illustrates an exposed top view of the sensor of FIG. 2 with the top cover, pull plate and mount bushings removed. FIG. 6 illustrates dowels 602, 604, 606 that may be press fit into the pull plate 202 and act both as plate movement guides guided by oval recesses in covers and press on leaf springs as tensile force is applied to the pull plate from the seat belt to create the force versus movement linear relationship. The ring shaped pull plate movement bearings may incorporate a center well reservoir 608 to hold extra lubricant which may disperse to areas over time to extend useful bearing lubricity.

Figure 7:
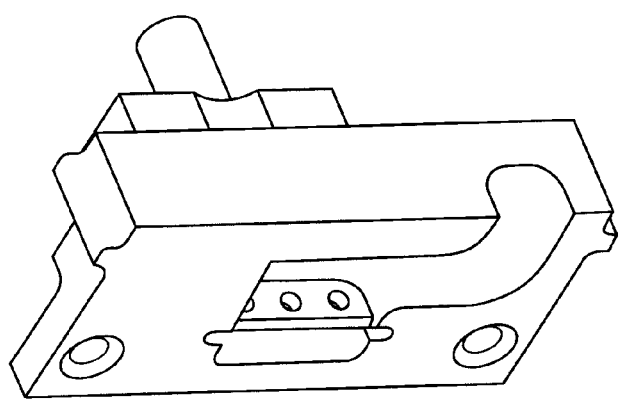
FIG. 7 is a perspective view of an electronics holder.

FIG. 7 illustrates an electronic holder that may incorporate labyrinth wire harness tunneling for effective strain relieving protection of the electronics. Modular tooling can be utilized to customize the harness exit location.

Figure 8:
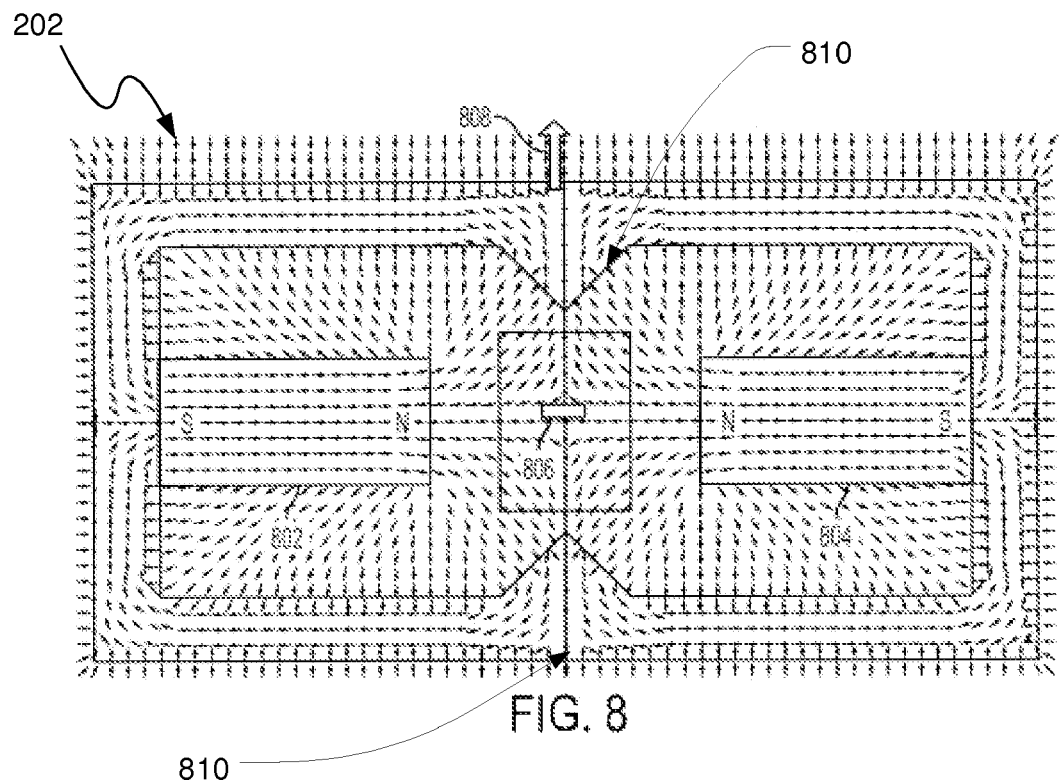
FIG. 8: diagrammatically illustrates an exemplary orientation of dual magnets and a Hall device with associated magnetic fields for use in a sensor consistent with an embodiment.

FIG. 8 illustrates an exemplary orientation of dual magnets 802, 804 and a Hall device with associated magnetic fields for use in a sensor consistent with an embodiment. The magnets 802 and 804 may be orientated as illustrated to permit a shorter package size. In particular, each of the magnets 802, 804 may be oriented with a first pole, e.g. a north pole (N), adjacent the sensor opening 806 and second pole, e.g. a south pole (S), positioned away from the sensor opening 806 toward a side of the sensor assembly, as shown. The magnets 802 and 804 may move with the pull plate 202, which may be made of steel, in the direction of the arrows 808. A metal pull plate 202 may serve as a closed loop magnetic return path for the magnetic circuit which further reduces the package size while also providing inherent magnetic shielding. The pull plate 202 may also feature tipped projections 810 defining the shape of the sensor opening which concentrate the magnetic full return path thereby encouraging a more linear magnetic gradient seen by the stationary hall sensor as the magnetic circuit moves with the pull plate 202.

Figure 9:
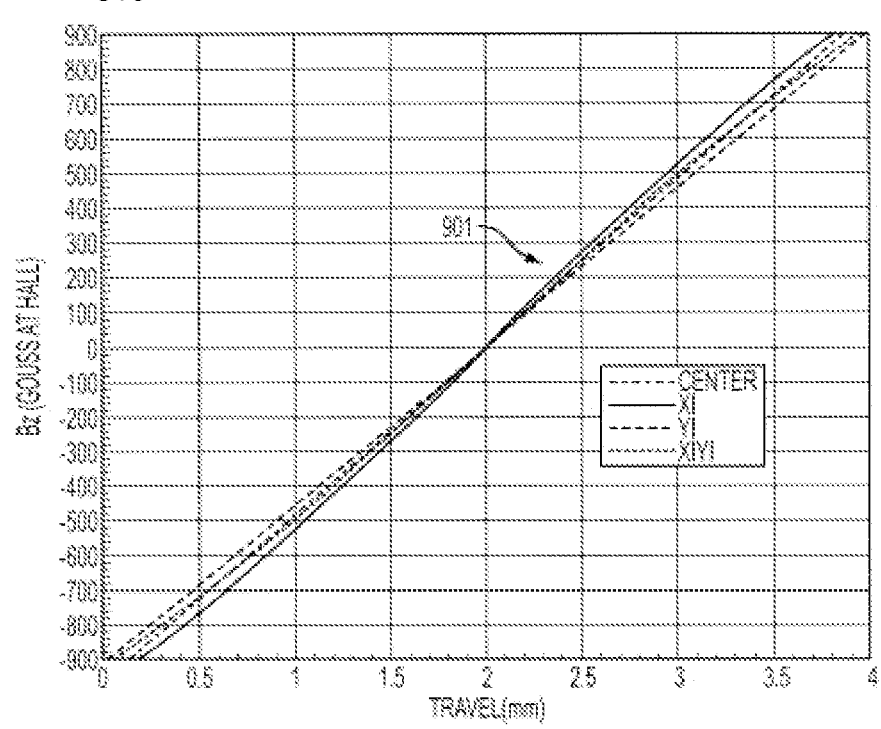
FIG. 9: is a plot of magnetic flux vs. distance associated with the configuration illustrated in FIG. 2.

FIG. 9 illustrates a plot 901 of magnetic flux vs. distance of travel of the magnets 802, 804, 254 relative to the Hall 806 for the embodiment illustrated in FIGS. 2-7 and including a magnetic circuit consistent with the configuration shown in FIG. 8.

Advantageously, the sensor 100 may have a further compact design. The compact design may be due in part to the orientation of the magnets relative to the direction of movement of the pull plate. The compact design may also be due in part to a metal pull plate being utilized as a closed loop magnetic return, which may also create inherent magnetic shielding. This compact design may be much shorter than a design that has all active elements such as the magnets and Hall sensor in series in the direction of tensile pull from the seat belt.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

What is claimed is:

1. A seat belt tension sensor assembly comprising:
    a pull plate having portions defining a belt loop opening for receiving seat belt webbing and a sensor opening;
    first and second magnets coupled to said pull plate on opposite sides of said sensor opening, each of said first and second magnets being oriented with a first pole adjacent said sensor opening and second pole positioned away from said opening toward a side of said sensor assembly;
    a sensor at least partially disposed in said sensor opening, said sensor being configured to provide an output in response to flux imparted thereto by said first and second magnets, and
    at least one projection extending from a side of said sensor opening generally towards said sensor, said at least one projection configured to direct magnetic flux from said first and second magnets through said sensor;
    whereby upon application of tension to said seat belt webbing, said pull plate is configured to move along a first axis of said seat belt tension sensor assembly relative to said sensor, said output of said sensor being indicative of a level of said tension.

2. A sensor according to claim 1, said sensor comprising a protective cover disposed over at least a portion of said pull plate.

3. A sensor according to claim 1 wherein said first and said second magnets move relative to said sensor.

4. A sensor according to claim 1 wherein said first and said second magnets each comprise a longitudinal axis extending through said first and said second poles and wherein said first and said second magnets are each arranged such that said longitudinal axis are substantially perpendicular to said first axis.

5. A sensor according to claim 4 wherein said first and said second magnets remain at a substantially constant distance from said sensor upon application of tension to said seat belt webbing.

6. A sensor according to claim 1 comprising a first and a second projection extending generally towards said sensor from a first and a second generally opposite side of said sensor opening of said pull plate, respectively.

7. A sensor according to claim 6 wherein said first and said at least a second projection extending from said first and said second sides of said sensor opening generally along said first axis.

8. A sensor according to claim 1 wherein said pull plate is configured to form a closed loop magnetic return.

9. A seat belt tension sensor assembly comprising:
a pull plate having portions defining a belt loop opening for receiving seat belt webbing and a sensor opening for receiving a sensor; said pull plate configured to move along a first axis of said seat belt tension sensor assembly relative to said sensor;
a sensor at least partially disposed in said sensor opening and configured to be stationary with respect to said pull plate;
a first and a second magnet coupled to said pull plate on opposite sides of said sensor opening, wherein said first and said second magnets each comprise a longitudinal axis extending through a first and a second pole and wherein said first and said second magnets are each arranged such that said longitudinal axis are substantially perpendicular to said first axis; and
a first and at least a second projection extending generally towards said sensor from a first and a second generally opposite side of said sensor opening of said pull plate, respectively, said first and said at least a second projection configured to direct magnetic flux from said first and second magnets in a closed-loop path through said sensor.

10. A sensor according to claim 9 wherein said first and said at least a second projection extend from said first and said second sides of said sensor opening generally along said first axis.

11. A sensor according to claim 10 wherein said first and said second magnets remain at a substantially constant distance from said sensor upon application of tension to said seat belt webbing.

12. A sensor according to claim 11 wherein said pull plate is configured to form a closed loop magnetic return.

* * * * *